United States Patent
Tsujimura et al.

(10) Patent No.: US 11,967,223 B2
(45) Date of Patent: Apr. 23, 2024

(54) DANGER PREDICTION METHOD AND DANGER PREDICTION DEVICE

(71) Applicant: NIPPON TELEGRAPH AND TELEPHONE CORPORATION, Tokyo (JP)

(72) Inventors: Sachi Tsujimura, Musashino (JP); Jun Onishi, Musashino (JP); Yasuhiro Maehara, Musashino (JP); Hidenobu Hirota, Musashino (JP); Naotsugu Ambe, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 382 days.

(21) Appl. No.: 17/603,624

(22) PCT Filed: Apr. 2, 2020

(86) PCT No.: PCT/JP2020/015133
§ 371 (c)(1),
(2) Date: Oct. 14, 2021

(87) PCT Pub. No.: WO2020/213408
PCT Pub. Date: Oct. 22, 2020

(65) Prior Publication Data
US 2022/0215743 A1 Jul. 7, 2022

(30) Foreign Application Priority Data
Apr. 17, 2019 (JP) ................................ 2019-078312

(51) Int. Cl.
G08B 31/00 (2006.01)
G06V 10/74 (2022.01)
(Continued)

(52) U.S. Cl.
CPC .......... *G08B 31/00* (2013.01); *G06V 10/761* (2022.01); *G06V 20/00* (2022.01); *G08B 21/02* (2013.01); *G10L 15/22* (2013.01)

(58) Field of Classification Search
CPC ............ G05B 23/0283; G05B 13/0265; G06V 20/58; G06V 10/761; G06V 20/00; G08B 31/00; G08B 21/02; G10L 15/22
See application file for complete search history.

(56) References Cited

U.S. PATENT DOCUMENTS 9,633,538 B1 * 4/2017 Kozloski ................ G06N 20/00
10,579,749 B1 * 3/2020 Davis ..................... G06F 30/20
(Continued)

FOREIGN PATENT DOCUMENTS

CN 108961672 A * 12/2018 ............. G08B 21/02
CN 109416257 A * 3/2019 ............ B60W 30/08
(Continued)

OTHER PUBLICATIONS

Kim et al., "Image-based construction hazard avoidance system using augmented reality in wearable device" (Year: 2017).*
(Continued)

*Primary Examiner* — Dung Hong
(74) *Attorney, Agent, or Firm* — Harness, Dickey & Pierce, P.L.C.

(57) ABSTRACT

The purpose of the present invention is to provide a hazard prediction method that can perform hazard prediction activities so as to prevent accidents, regardless of skills and personalities of workers.
A hazard prediction method according to the present invention includes: photographing an outdoor facility along with environment to capture an image; collating the image with accident data including photos of outdoor facilities along with environment and accidents occurred at open-air facili-
(Continued)

ties in the photos to detect, when a photo similar to the image is found, an accident occurred at an open-air facility in the photo from the accident data; extracting, from a safety measure list describing accidents, hazardous spots related to the accidents, and safety measures for prevention of the accidents, hazard information on a hazardous spot and a safety measure corresponding to the detected accident; receiving input information that is a safety measure devised by a worker for the hazardous spot; and comparing the input information with the hazard information to check that the input information and the hazard information match each other.

8 Claims, 11 Drawing Sheets

(51) Int. Cl.
*G06V 20/00* (2022.01)
*G08B 21/02* (2006.01)
*G10L 15/22* (2006.01)

(56) References Cited

U.S. PATENT DOCUMENTS

| | | | | |
|---|---|---|---|---|
| 2009/0273479 | A1* | 11/2009 | Waugh | G08B 21/12 340/584 |
| 2014/0132409 | A1* | 5/2014 | Billman | G08B 19/00 463/31 |
| 2015/0030203 | A1* | 1/2015 | Kim | G08B 17/125 382/103 |
| 2015/0325047 | A1* | 11/2015 | Conner | G06F 3/04847 345/633 |
| 2016/0343163 | A1* | 11/2016 | Venkatesha | G01S 5/02 |
| 2017/0089710 | A1* | 3/2017 | Slusar | G01C 21/3833 |
| 2017/0147952 | A1* | 5/2017 | Kozloski | G05B 19/406 |
| 2017/0178490 | A1* | 6/2017 | Kozloski | G08B 21/043 |
| 2017/0322119 | A1* | 11/2017 | Da Silva | G06K 7/10386 |
| 2019/0318165 | A1* | 10/2019 | Shah | G06T 7/0002 |
| 2020/0175767 | A1* | 6/2020 | Stivi | G08B 25/10 |
| 2020/0242360 | A1* | 7/2020 | Alexander | G06N 20/00 |

FOREIGN PATENT DOCUMENTS

| | | | |
|---|---|---|---|
| EP | 2133474 A2 * | 12/2009 | B08B 3/026 |
| JP | 2011242365 A | 12/2011 | |
| JP | 201578849 A | 4/2015 | |

OTHER PUBLICATIONS

General Incorporated Foundation Small and Medium Construction Special Education Association, Chapter 6 Safety Construction Cycle Performed by Foreman / Safety and Health Officer, 6-5 Danger Prediction Activities (Local KY), Foreman / Safety and Health Officer Education Curriculum, Mar. 18, 2019 (Reading Day), https://www.tokubetu.or.jp/text_shokuan/part6/text_shokuan6-5.html.

Hiroyuki Umeda, Anomaly detection that learns normal and abnormal data (vol. 4), System Integrator Co., Ltd., AISIA-AD, Sep. 14, 2018, https://products.sint.co.jp/aisia-ad/blog/deep-learning-vol.4.

Takumi Kobayashi and Takeshi Nagami, Automatic crack detection of concrete structures, AIST Today, vol. 14, No. 12, 2014, pp. 8-9, https://www.aist.go.jp/Portals/0/resource_images/aist_I/aistinfo/aist_today/vol14_12/vol14_12_p08_p09.pdf.

A.N.Lab Joint Stock Company, Basic Principles of Image Matching Technology, literature, Mar. 27, 2014, https://anlab.jp/ja/introduction-to-image-matching-principles/.

Daisuke Sato, Image analysis by deep learning, its mechanism and learning method, I Magazine Co., Ltd., i Magazine, Mar. 25, 2018, https://www.imagazine.co.jp/?s=%E3%83%87%E3%82%A3%E3%83%BC%E3%83%97%E3%83%A9%E3%83%BC%E3%83%8B%E3%83%B3%E3%82%B0%E3%81%AB%E3%82%88%E3%82%8B%E7%94%BB%E5%83%8F%E8%A7%A3%E6%9E%90.

* cited by examiner

DETERMINATION CRITERIA a: SLOPE (ANGLE) OF ELECTRIC POLE
X: ANGLE OF FAULTY ELECTRIC POLE a < X: NORMAL
a ≥ X: ABNORMAL

Fig. 8

DETERMINATION CRITERIA a: HEART RATE VALUE AT MOST TENSED STATE DURING OPERATION (THRESHOLD)
X: HEART RATE VALUE BEFORE WORK a > X: NORMAL
a ≤ X: ABNORMAL

Fig. 9

OPERATION A: IS SIMILAR PHOTO PRESENT?
α: IMAGE OF ON-SITE OUTDOOR FACILITY
X: STORED ACCIDENT PHOTO
α ≈ X: HAZARDOUS SPOT IS PRESENT

OPERATION B: COMPARE SAFETY MEASURE WITH SPEECH-TO-TEXT DATA
β: SPEECH-TO-TEXT DATA
Y: SAFETY MEASURE
β = Y: NORMAL
β ≠ Y: ABNORMAL

DANGER PREDICTION METHOD AND DANGER PREDICTION DEVICE

CROSS-REFERENCE TO RELATED APPLICATIONS

This application is a 371 U.S. National Phase of International Application No. PCT/JP2020/015133 filed on Apr. 2, 2020, which claims priority to Japanese Application No. 2019-078312 filed on Apr. 17, 2019. The entire disclosures of the above applications are incorporated herein by reference.

TECHNICAL FIELD

The present disclosure relates to a hazard prediction method and a hazard prediction apparatus that cause a worker to recognize hazardous spots at a work site.

BACKGROUND ART

Figure 1:
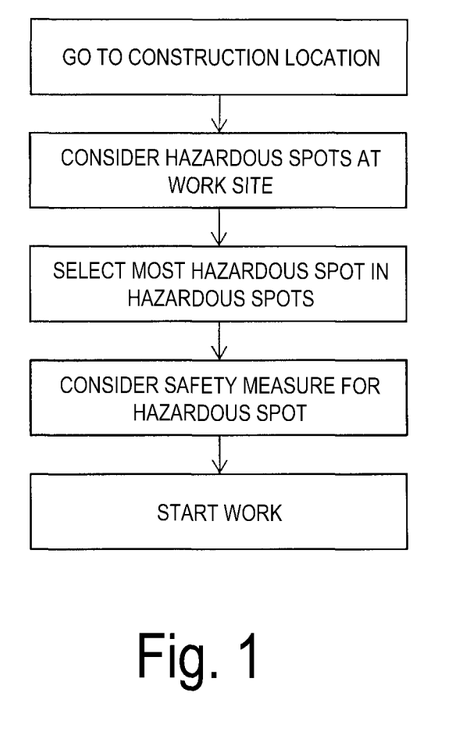
FIG. 1 is a flowchart illustrating hazard prediction activities.

Hazard prediction activities (see Non Patent Literature 1) is started when a worker goes to a work site and stands in front of a construction target. FIG. 1 is a flowchart describing hazard prediction activities. For example, the case where the construction target is an electric pole will be described. The worker stands in front of the electric pole and considers possible hazards contained in the work while contemplating a construction work. This is to avoid accidents or injuries. For example, when climbing the electric pole with a ladder, the worker may fall from the electric pole and be hurt. Thus, the worker considers measures against injuries, such as fixation of the ladder to the electric pole so that the ladder does not tilt. Such safety measure is taken before start of the work.

CITATION LIST

Patent Literature

Patent Literature 1: JP 2015-078849 A
Patent Literature 2: JP 2011-242365 A

Non Patent Literature

Non Patent Literature 1: Web site of The Small and Medium Construction Special Education Association, Education and Curriculum for Foreman and Safety and Health Controller, Chapter 6: Safe Construction Cycle Performed by Foreman and Safety and Health Controller, 6-5: Hazard Prediction Activities (spot KY) (https://www.tokubet-u.or.jp/text_shokuan/part6/text_shokuan6-5.html) searched on Mar. 29, 2019
Non Patent Literature 2: System Integrator Corp., Deep Learning Abnormality Detection System (AISIA-AD), Abnormality Detection Learning Normal and Abnormal Data (Vol. 4) (https://products.sint.co.jp/aisia-ad/blog/deep-learning-vol. 4), searched on Apr. 9, 2019
Non Patent Literature 3: National Institute of Advanced Industrial Science and Technology, TODAY, 2014-12, Automatic Detection of Crack in Concrete Structure (https://www.aist.go.jp/Portals/0/resource_images/aist_j/aistinfo/aist_today/vol_14_12/vol14_12_p08_p09.pdf) searched on Apr. 9, 2019
Non Patent Literature 4: A.N.Lab Joint Stock Company, Basic Principles on Image collation Technology (http://anlab.jp/development/imagecollationbasics/) searched on Apr. 9, 2019
Non Patent Literature 4: i Magazine Corporation, Image Learning by Deep Learning, Mechanism thereof and Learning Method (https://www.imagazine.co.jp/?s=%E3%83%87% E3%82% A3% E3%83% BC % E3%83%97% E3% 83% A9% E3%83% BC % E3%83%8B % E3%83% B3% E3%82% B0% E3%81% AB % E3%82%88% E3%82%8B % E7%94% BB % E5%83%8F % E8% A7% A3% E6%9E %90) searched on Apr. 9, 2019

SUMMARY OF THE INVENTION

Technical Problem

However, because the experience value of the worker varies depending on years of experience and type of construction, everyone cannot perform the same hazardous prediction activity. Workers with low experience values are accident-prone, but workers with high experience values do not necessarily prevent accidents. For example, workers having different personalities, such as cautious personality and speed-emphasized (hasty) personality, differently predict hazards. In addition, the hazard prediction varies depending on the physical condition of the worker on the day. When the physical condition is poor, the worker loses concentration, easily making mistakes. Thus, even when the hazard prediction activity is performed, some accident may disadvantageously occur for the above-mentioned reasons.

Therefore, in order to solve the problem described above, an object of the present invention is to provide a hazard prediction method and a hazard prediction apparatus that can perform a hazard prediction activity so as to prevent accidents, regardless of skills and personalities of workers.

Means for Solving the Problem

In order to achieve the above object, in a hazard prediction method and a hazard prediction apparatus according to the present invention, a work site is recognized from an image of the work site, the image is collated with past accident data to detect hazard information, and whether or not hazard prediction made by the worker is correct is determined.

Specifically, the hazard prediction method according to an aspect of the present invention includes: photographing an outdoor facility along with environment to capture an image; collating the image with accident data including photos of outdoor facilities along with environment and accidents occurred at open-air facilities in the photos to detect, when a photo similar to the image is found, an accident occurred at an open-air facility in the photo from the accident data; extracting, from a safety measure list describing accidents, hazardous spots related to the accidents, and safety measures for prevention of the accidents, hazard information on a hazardous spot and a safety measure corresponding to the detected accident; displaying the extracted hazardous spot; receiving input information that is a safety measure devised by a worker for the displayed hazardous spot; comparing the input information with the hazard information to check that the input information and the hazard information match each other; and controlling tool availability such that a tool is available when the input information and the hazard information match each other and the tool is unavailable when the input information and the hazard information do not match each other.

In addition, a hazard prediction apparatus according to an aspect of the present invention includes: an image acquisition unit configured to photograph an outdoor facility along with environment to capture an image; a voice acquisition unit configured to receive an input of voice of a worker; a display unit configured to display information to the worker; a tool use control unit configured to restrict use of a tool; and an information processing unit configured to connect the image acquisition unit, the voice acquisition unit, the display unit, and the tool use control unit, wherein the information processing unit includes: a collation circuit configured to collate the image captured by the image acquisition unit with accident data including photos of outdoor facilities along with environment and accidents occurred at open-air facilities in the photos to detect, when a photo similar to the image is found, an accident occurred at an open-air facility in the photo from the accident data; an extraction circuit configured to extract, from a safety measure list describing accidents, hazardous spots related to the accidents, and safety measures for prevention of the accidents, hazard information on a hazardous spot and a safety measure corresponding to the accident detected by the collation circuit; a hazardous spot display circuit configured to cause the display unit to display the hazardous spot extracted by the extraction circuit; an input circuit configured to receive input information that is a safety measure uttered by a worker for the hazardous spot displayed by the display unit, from the voice acquisition unit; a checking circuit configured to compare the input information from the input circuit with the hazard information from the extraction circuit to check that the input information and the hazard information match each other; and a control signal output circuit configured to output a signal to the tool use control unit when the input information and the hazard information match each other such that a tool is available and output a signal to the tool use control unit when the input information and the hazard information do not match each other such that a tool is unavailable.

The hazard prediction method and the hazard prediction apparatus according to the present invention have a correct solution of a safety measure capable of preventing accidents in construction, and cause the worker to utter a safety measure and permit the worker to perform construction work only when the safety measure reaches the correct solution. Accordingly, the present invention can provide a hazard prediction method and a hazard prediction apparatus that can make a hazard prediction activity so as to prevent accidents, regardless of skills and personalities of workers.

In the hazard prediction method according to an aspect of the present invention, the environment includes positional information on the outdoor facility.

The hazard prediction apparatus according to an aspect of the present invention further includes a positional information acquisition unit configured to acquire positional information on the outdoor facility, and the environment includes the positional information on the outdoor facility.

Hazardous prediction activities can be performed in consideration of the situation around the construction target.

The hazard prediction method according to an aspect of the present invention further includes determining normality of the outdoor facility from the image to notify the worker of abnormality when the outdoor facility is abnormal.

Further, the information processing unit of the hazard prediction apparatus according to an aspect of the present invention further includes a normality determination circuit configured to determine normality of the outdoor facility from the image to notify the worker of abnormality when the outdoor facility is abnormal.

Further, the hazard prediction method according to the present invention further includes acquiring heart rate of the worker to notify, when the heart rate is larger than a threshold, the worker that the heart rate is larger than the threshold.

The information processing unit of the hazard prediction apparatus further includes a health determination circuit configured to acquire heart rate of the worker to notify, when the heart rate is larger than a threshold, the worker that the heart rate is larger than the threshold via the display unit.

Construction can be stopped when the construction target or the health condition is abnormal.

Effects of the Invention

The present invention can provide a hazard prediction method and a hazard prediction apparatus that can make hazard prediction activities so as to prevent accidents, regardless of skills and personalities of workers.

DESCRIPTION OF EMBODIMENTS

Embodiments of the present invention will be described with reference to the accompanying drawings. The embodiments described below are examples of the present invention and the present invention is not limited to the embodiments described below. Note that components with the same reference signs in the specification and the drawings are assumed to be the same components.

Overview

The hazard prediction apparatus according to the present invention includes following functions.

(1) Recognize surrounding environment and facilities based on a pre-operation image of a work location and GPS information by using a hazardous spot notification terminal, and compare the recognized surrounding environment and facilities with hazardous spots extracted from past accidents in accident data to determine whether or not they match each other.

(2) Indicate the hazardous spot and safety measure based on accident data.

(3) Infer work steps, tools to be used, heavy machinery and a construction method from the recognized information.
(4) Determine whether or not the tools to be used and the heavy machinery are available from incline information.
(5) Indicate the work steps, the available tools, the heavy machinery, and the construction method from the recognized information.
(6) Control (lock) the tools to be used so as to disable the tool when the incorrect hazard measure is implemented.
(7) Release the control (lock) of the tool to be used when an appropriate hazard measure is implemented.
(8) Check the normality of working outdoor facility.
(9) Check the normality of the health condition of the worker.

Effects

Following effects are obtained by using the hazard prediction apparatus having the above-described functions.

(A) The safety measure based on the accident data can be notified.

Figure 2:
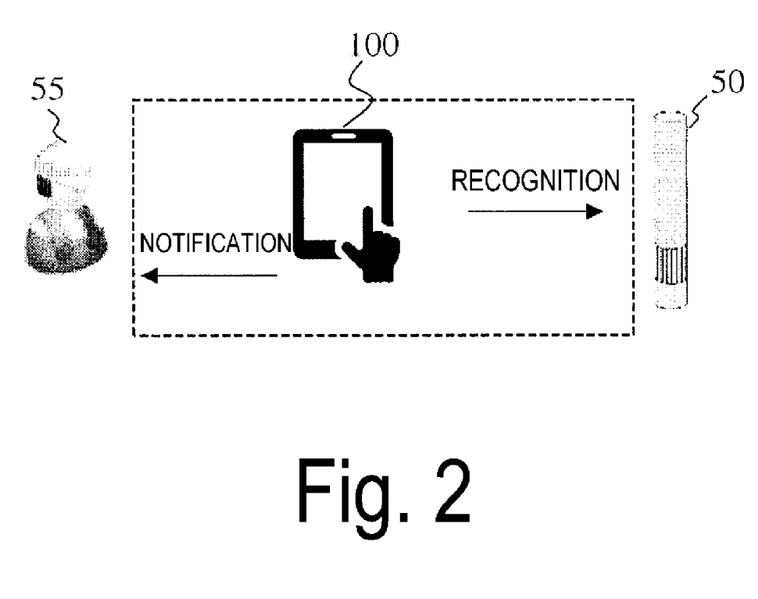
FIG. 2 is a diagram illustrating a method of using a hazard prediction apparatus according to the present invention.

For example, as illustrated in FIG. 2, a worker 55 takes a photo of an electric pole, which is outdoor facility 50, by using a terminal (tablet 100). "Recognition" in FIG. 2 refers to taking a photo. Then, past accidents that have occurred at electric poles installed in similar environments are displayed on the tablet 100. "Notification" in FIG. 2 refers to displaying the past accidents on the tablet 100 and notifying the worker of the accidents. From the notification from the tablet 100, even the worker with less work experience can know the past accident cases on the spot. Accordingly, the worker can use the terminal to reduce the probability of occurrence of accidents.

(B) The safety measure responding to surrounding information can be notified.

The tablet 100 having a GPS function can take information on surroundings of the work location into account, further enhancing safety. For example, when there is an elementary school around the work location, children may walk on a road on their way to and from the school. When working on their way to and from the school, the worker must pay much attention to children. The GPS function enables the tablet 100 to display such surrounding information to call the worker's attention.

(C) The safety measure responding to weather information can be notified. Further, the tablet 100 having the GPS function can also take weather at the work location into account, further enhancing safety. The work is done in outside environment (outdoor). In other words, it is conceivable that the work environment greatly varies depending on weather. For example, construction under a heavy rain decreases the work efficiency. Thus, if it can be expected that the weather greatly turns bad at the work location, the worker is easy to schedule work. That is, the tablet 100 with the GPS function can display the latest weather information (weather forecast after a few hours or a sudden notice such as a strong-wind warning) in addition to positional information. The worker can check the information to schedule efficient work and work safely.

(D) Whether construction is continued or discontinued can be appropriately determined based on the condition of the outdoor facility where the work is performed. The electric pole stands vertical (90 degrees) to the ground when installed, but may be tilted with time due to a load applied from equipment such as cables on the electric pole. When the installation angle of the electric poles becomes less than 86 degrees, the electric pole lacks in balance to become hazardous and thus, needs to be replaced.

The slopes of electric poles are regularly checked and however, it is difficult to acquire latest slope information on all of the many electric poles.

The worker climbs the electric pole to be worked and performs a construction work. When the worker climbs a largely tilted electric pole, the electric pole may be broken during work, resulting in that the worker falls and becomes injured. Thus, the worker can determine whether or not the work may be started by taking a photo of the electric pole with the tablet 100, calculating the slope of the electric pole and notifying the worker of the calculated slope. That is, the tablet 100 can notify the worker of the risk of the electric pole having a reduced installation angle, enhancing safety. In addition, the tablet 100 can also notify related parties or related companies of the electric pole having a reduced installation angle.

(E) The start of work can be permitted.

For example, a toolbox is provided with a locking mechanism that cooperates with the tablet 100 such that the toolbox cannot be unlocked unless the worker takes a photo with the tablet 100. In addition, the toolbox cannot be unlocked when the safety measure devised by the worker is erroneous or the installation angle of the electric pole is small.

Further, by attaching a heart rate meter cooperating with the tablet 100 to the worker to know the health condition of the worker, when the health condition of the worker is poor, the tablet can notify the related parties or related companies of the fact to discontinue work.

First Embodiment

Figure 3:
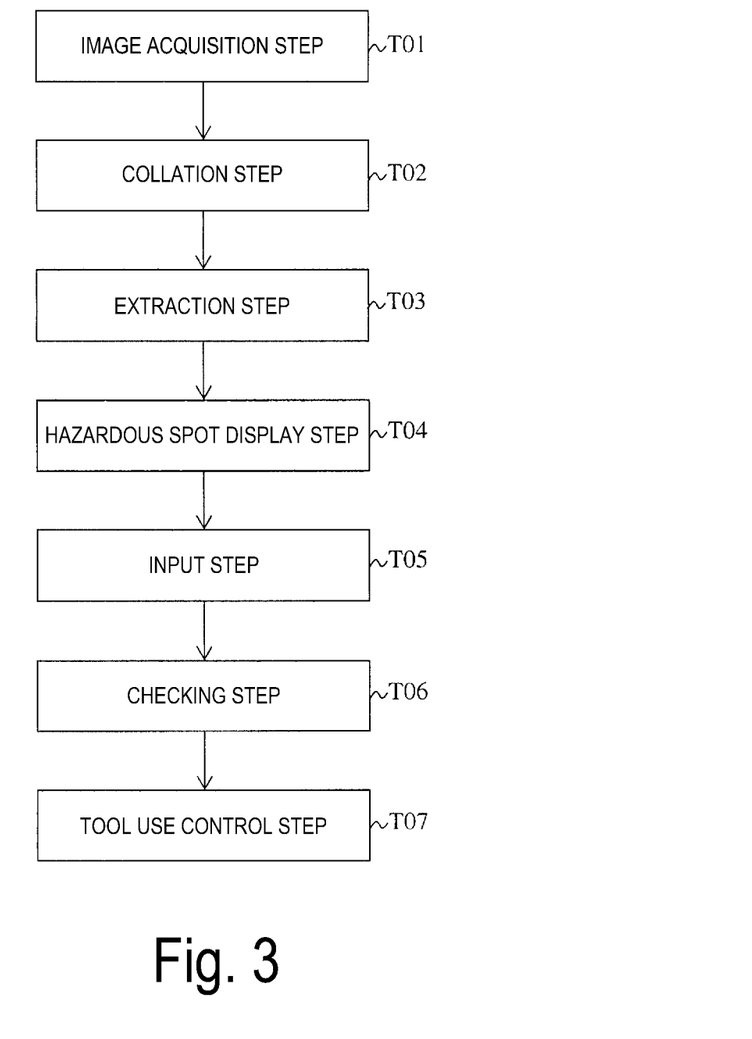
FIG. 3 is a flowchart illustrating a hazard prediction method according to the present invention.

FIG. 3 is a flowchart illustrating a hazard prediction method performed by the tablet 100 according to the present embodiment. The hazard prediction method includes an image acquisition step T01, a collation step T02, an extraction step T03, a hazardous spot display step T04, an input step T05, a checking step T06, and a tool use control step T07.

In the image acquisition step T01, an outdoor facility along with environment is photographed to capture an image.

In the collation step T02, the image is collated with accident data including photos of outdoor facilities along with environment and accidents occurred at open-air facilities in the photos, and when a photo similar to the image is found, an accident occurred at any open-air facility in the photo is detected from the accident data.

In the extraction step T03, hazard information on the hazardous spot and the safety measures, which corresponds to the detected accident, is extracted from a safety measure list describing accidents, hazardous spots about the accidents, and safety measures for preventing the accidents.

In the hazardous spot display step T04, the detected hazardous spot is displayed.

In the input step T05, input information, which is safety measures devised by the worker, is input to the displayed hazardous spot.

In the checking step T06, the input information is compared with the hazard information to check that the input information and the hazard information match each other.

In the tool use control step T07, the tool is made available when the input information and the hazard information match each other, and is made unavailable when the input information and the hazard information do not match each other.

Figure 4:
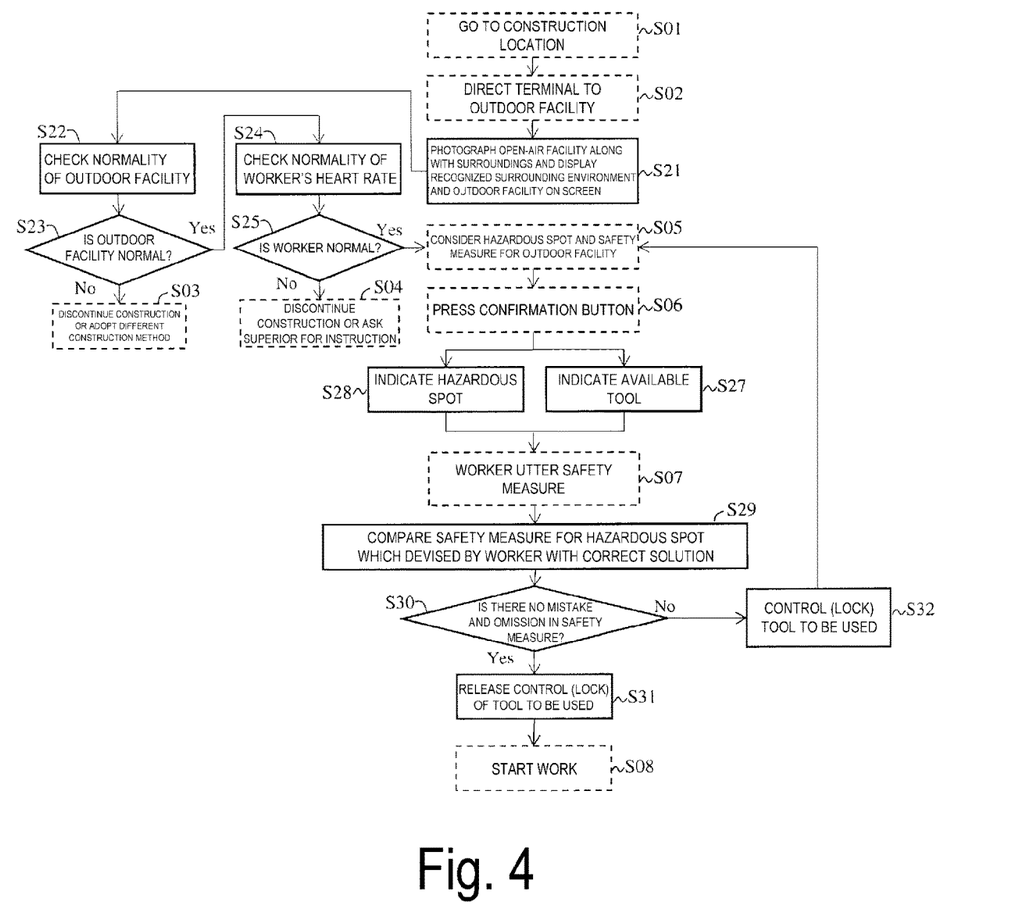
FIG. 4 is a flowchart illustrating the hazard prediction method according to the present invention.

FIG. 4 is a flowchart describing a hazard prediction method including the work of the worker. Steps S01 to S08 are work Steps of the worker, and Steps S21 to S32 are operation Steps of the tablet 100.

Figure 5:
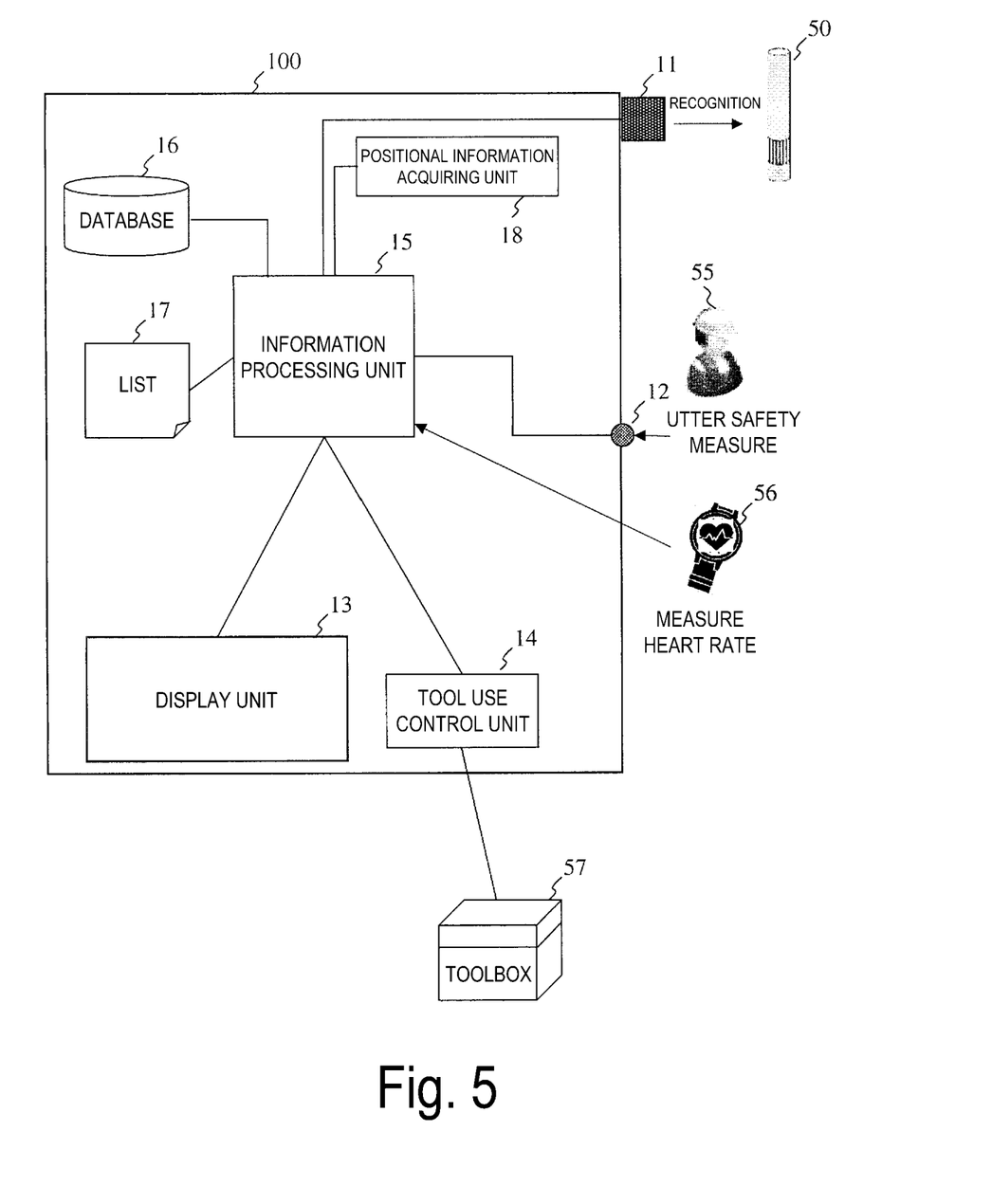
FIG. 5 is a diagram illustrating a hazard prediction apparatus according to the present invention.

FIG. 5 is a diagram illustrating the tablet 100. The tablet 100 includes an image acquisition unit 11, a voice acquisition unit 12, a display unit 13, a tool use control unit 14, and an information processing unit 15.

The image acquisition unit 11 photographs the outdoor facility 50 along with environment to capture an image.

The voice acquisition unit 12 receives an input of voice of the worker 55.

The display unit 13 displays information to the worker 55.

The tool use control unit 14 restricts the use of a tool.

The information processing unit 15 is connected to the image acquisition unit 11, the voice acquisition unit 12, the display unit 13, and the tool use control unit 14.

Further, the tablet 100 further includes a positional information acquisition unit 18 that acquires positional information on the outdoor facility. Note that the environment includes a work location including the outdoor facility, the periphery thereof, or positional information on the outdoor facility.

Further, the tablet 100 may include a database 16 that stores accident data including photos of the outdoor facilities along with environment and accidents occurred at the outdoor facilities in the photos, a safety measure list 17 that describes accidents, hazardous spots related to the accidents, and safety measures for preventing the accidents. Note that the database 16 and the list 17 may be external to the tablet 100 and the tablet 100 may acquire information from the database 16 and the list 17 by communication.

Figure 6:
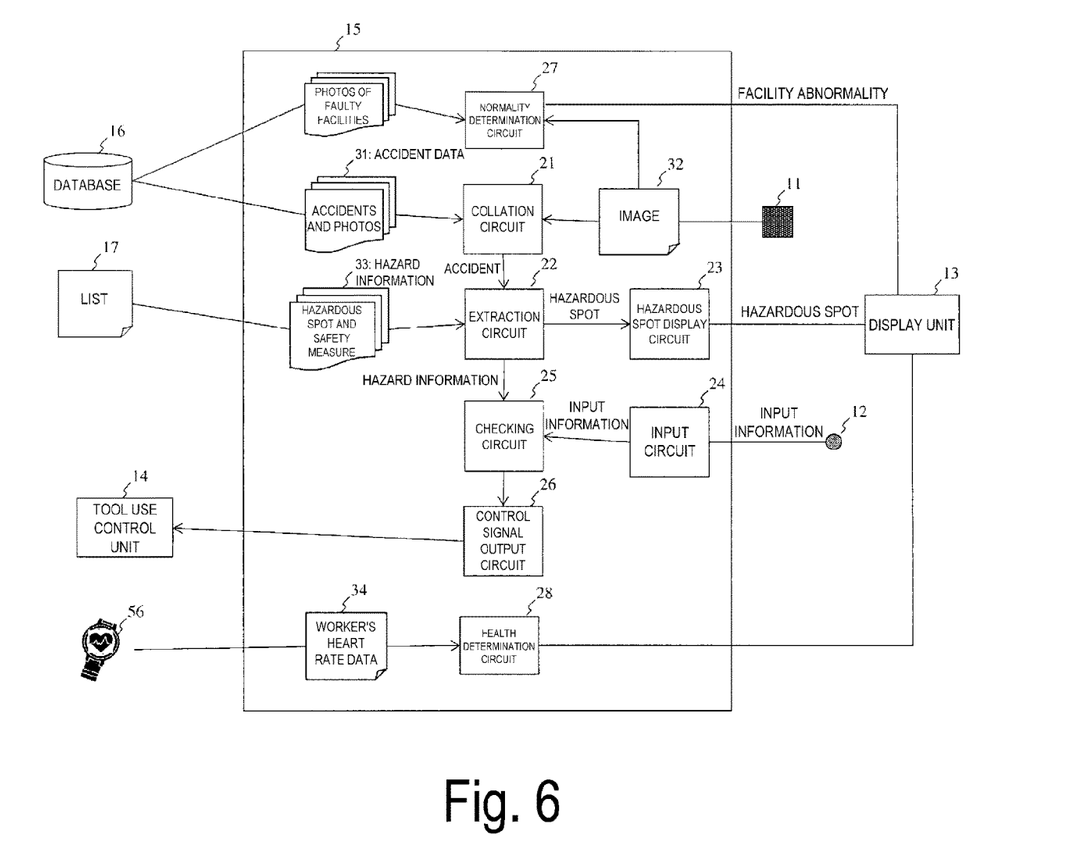
FIG. 6 is a diagram illustrating the hazard prediction apparatus according to the present invention.

FIG. 6 is a diagram illustrating the information processing unit 15. The information processing unit 15 includes a collation circuit 21, an extraction circuit 22, a hazardous spot display circuit 23, an input circuit 24, a checking circuit 25, and a control signal output circuit 26.

The collation circuit 21 collates accident data 31 including photos of outdoor facilities along with environment and accidents occurred at the outdoor facilities in the photos with an image 32 captured by the image acquisition unit 11, and when a photo similar to the image 32 is found in the accident data 31, detects the accident occurred at an open-air facility in the photo.

The extraction circuit 22 extracts hazard information 33 on the hazardous spot and the safety measure, which corresponds to the accident detected by the collation circuit 21, from the safety measure list 17.

The hazardous spot display circuit 23 causes the display unit 13 to display the hazardous spot extracted by the extraction circuit 22.

The input circuit 24 receives input information, which is a safety measure for the hazardous spot displayed on the display unit 13, as voice of the worker from the voice acquisition unit 12.

The checking circuit 25 compares the input information from the input circuit 24 with the hazard information 33 from the extraction circuit 22 and checks that the input information and the hazard information match each other.

The control signal output circuit 26 outputs a signal to the tool use control unit 14 when the input information and the hazard information match each other such that tools are available, and outputs a signal to the tool use control unit 14 when the input information and the hazard information do not match each other such that tools are unavailable.

Operations of the tablet 100 will be described with reference to a flowchart in FIG. 4.

In Step S01, the worker 55 goes to a construction location of the outdoor facility 50 to be worked.

In Step S02, the worker 55 directs the tablet 100 to the outdoor facility 50.

In Step S21, the tablet 100 photographs the outdoor facility 50 along with surrounding landscape by the image acquisition unit 11 (image acquisition step T01). The tablet 100 causes the display unit 13 to display the surrounding environment and the outdoor facility 50 that are recognized at the work location. Note that the tablet 100 includes a positional information acquisition unit 18 (for example, GPS), and the positional information acquisition 18 recognizes the work location.

Figure 7:
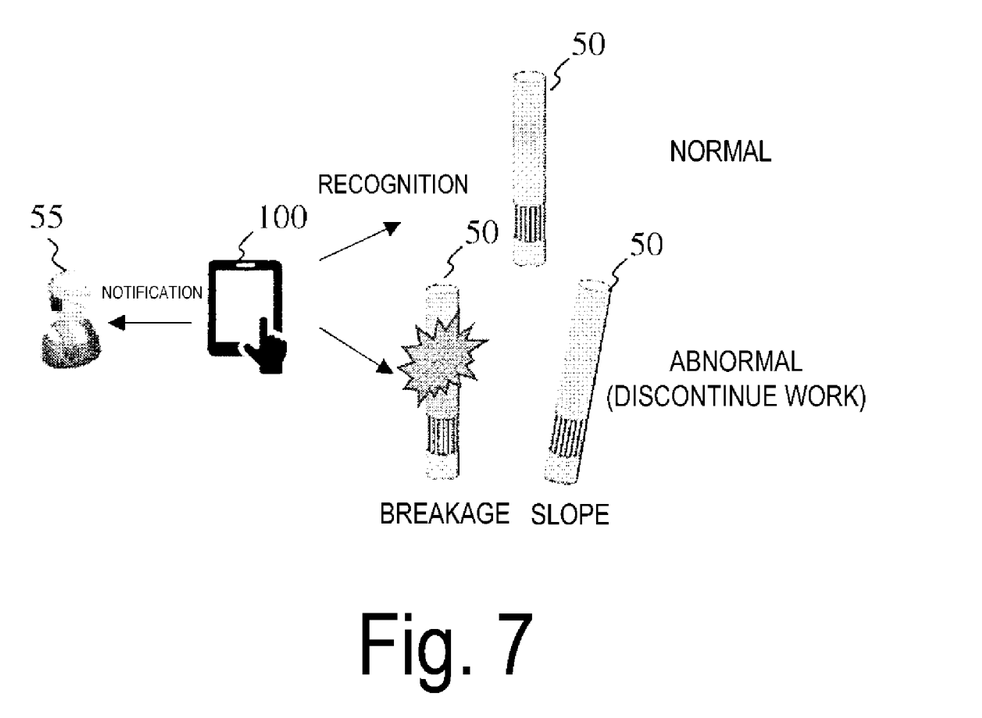
FIG. 7 is a diagram illustrating operations of the hazard prediction apparatus according to the present invention.
Figure 8:
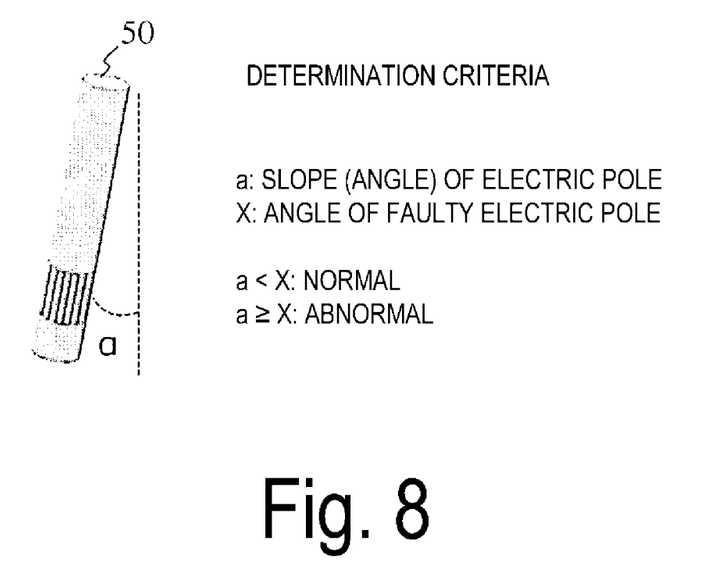
FIG. 8 is a diagram illustrating operations of the hazard prediction apparatus according to the present invention.

In Steps S22 and S23, the tablet 100 checks normality (e.g., slope, breakage, crack, etc. of the electric pole) for the outdoor facility 50 at the work location. FIG. 7 is a diagram describing Steps S22 and S23. The slope of the electric poles can be acquired by the method described in Patent Literature 1, for example (see FIG. 8). The breakage or crack of the electric pole can be determined by, for example, causing photos of faulty facilities with breakage or crack to be machine-learned in advance, and collating the photos with a photo taken at the work site by the collation circuit 21 (see, for example, Non Patent Literatures 2 and 3, and Patent Literature 2). When the outdoor facility 50 is abnormal, for example, the slope of the electric pole has reached a defined value, or breakage or crack is present, the tablet 100 displays the abnormality on the screen or the like. Then, the worker discontinues the construction or then cancels the operation or adopts a different construction method (Step S03).

Figure 9:
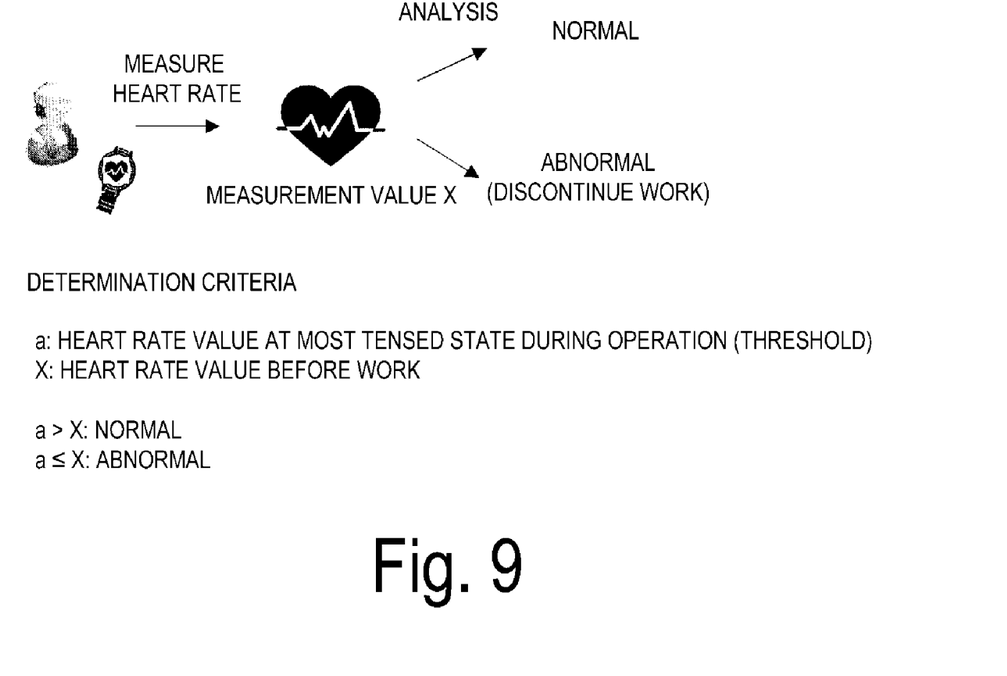
FIG. 9 is a diagram illustrating operations of the hazard prediction apparatus according to the present invention.

On the contrary, when the outdoor facility 50 is normal, the tablet 100 acquires heart rate data 34 of the worker 55 by the health determination circuit 28 to check the health condition of the worker 55 (Steps S24 and S25). FIG. 9 is a diagram describing Steps S24 and S25. That is, the tablet 100 acquires the heart rate of the worker 55 and when the heart rate is larger than a threshold (abnormal), notifies the worker 55 of the abnormality. In this case, the worker 55 discontinues construction or asks a superior for instruction (Step S04).

On the contrary, when the heart rate of the worker 55 is normal, the worker 55 considers the hazardous spot and the safety measure for the outdoor facility 50 and surrounding environment at Step S05, and once ideas have taken shape, presses a confirmation button displayed on the display unit 13 of the tablet 100 in Step S06. In Step S28, the tablet 100 performs the collation step T02 and the extraction step T03, and displays the hazardous spot on the display unit 13 (hazardous spot display step T04). The collation step T02 and extraction step T03 will be described later. In addition, the tablet 100 displays the available tools on the display unit 13 in Step S27.

Figure 10:
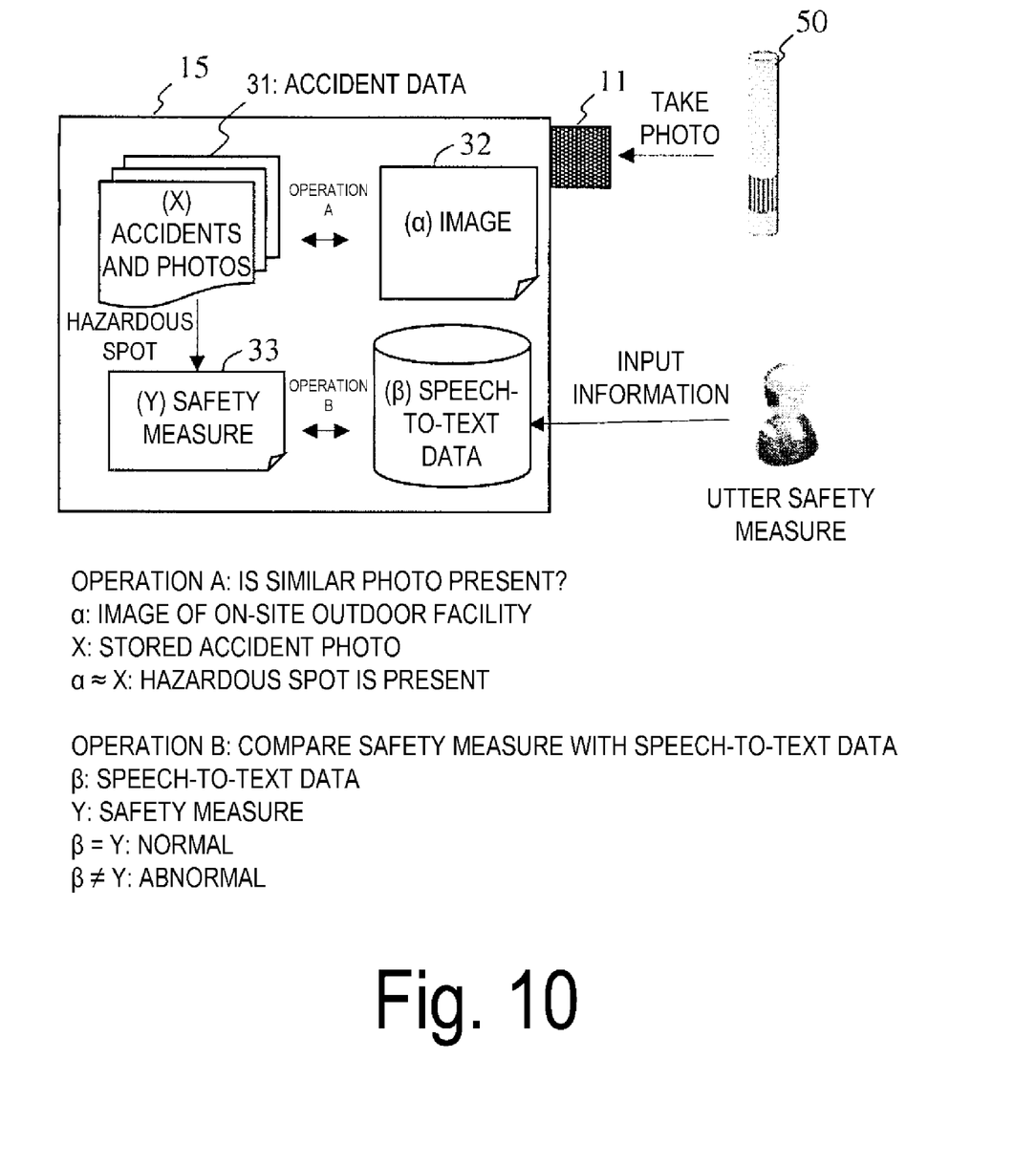
FIG. 10 is a side view illustrating operations of the hazard prediction apparatus according to the present invention.

FIG. 10 is a diagram illustrating the collation step T02 and the extraction step T03. The database 16 stores the accident data 31 including past accidents occurred at outdoor facilities and photos of the accidents. When the image acquisition unit 11 acquires the image 32 of the outdoor facility 50, the information processing unit 15 searches the database 16 for a photo similar to the image 32 (collation step T02). The similarity between the image 32 and the photo is determined by, for example, image matching (see, for example, Patent Literature 3 and Non Patent Literatures 4 and 5). When finding the photo similar to the image 32, the information processing unit 15 determines that a hazardous spot is present at the outdoor facility 50. In this case, the information processing unit 15 acquires the hazardous spots and the safety measure from the list 17 that stores the hazard information 33 describing hazardous spots and safety measures therefor (extraction step T03).

Figure 11:
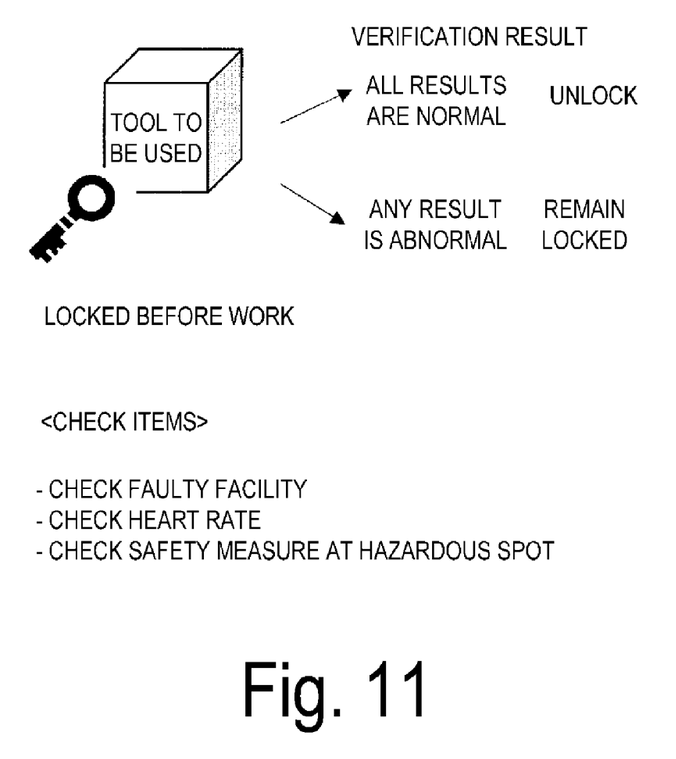
FIG. 11 is a diagram illustrating operations of the hazard prediction apparatus according to the present invention.

In Step S07, the worker utters a security measure for the hazardous spot, which is considered in Step S05. In Steps S29 and S30, tablet 100 captures the workers voice with a microphone (input information) and compares the input information with the hazardous spot and the safety measure (hazard information) extracted in the extraction step T03 to check matching/unmatching of the information and omissions. FIG. 10 also illustrates Steps S29 and S30. The information processing unit 15 converts the input information into text. The information processing unit 15 compares the speech-to-text data with the safety measure. When there is no omission in the input information (safety measure uttered by the worker 55) and the hazard information and the input information match each other, the tablet 100 determines that the worker 55 knows the safety measure and unlocks the tools to be used (Step S31). FIG. 11 is a diagram illustrating Steps S31 and S32. Then, the worker 55 starts construction of the outdoor facility 50 (Step S08).

On the contrary, when there is an omission in the input information or the hazard information and the input information do not match each other, the locking of the tools to be used is continued in Step S32 (the worker 55 cannot use the tool). Then, the worker 55 re-considers the hazardous spot and the safety measure for the outdoor facility 50 and surrounding environment from Step S05.

Note that the lock of the tools to be used is controlled in consideration of not only for checking the safety measure for the hazardous spot but also the normality of the facility in Step S23 and the normality of health condition in Step S25. When the facility is normal, the health condition is normal, and the safety measure for the hazardous spot is correct, the tools to be used are unlocked. On the contrary, when the facility is faulty, the health condition is poor, or the safety measure is incorrect, the tools to be used remain locked.

REFERENCE SIGNS LIST

11: Image acquisition unit
12: Voice acquisition unit
13: Display unit
14: Tool use control unit
15: Information processing unit
16: Database
17: List
18: Positional information acquisition unit
21: Collation circuit
22: Extraction circuit
23: Hazardous spot display circuit
24: Input circuit
25: Checking circuit
26: Control signal output circuit
27: Normality determination circuit
28: Health determination circuit
31: Accident data
33: Hazard information
34: Heart rate data
50: Outdoor facility
55: Worker
56: Heart rate meter
57: Tool

The invention claimed is:

1. A hazard prediction method comprising:
photographing an outdoor facility along with environment to capture an image;
collating the image with accident data including photos of outdoor facilities along with environment and accidents occurred at open-air facilities in the photos to detect, when a photo similar to the image is found, an accident occurred at an open-air facility in the photo from the accident data;
extracting, from a safety measure list describing accidents, hazardous spots related to the accidents, and safety measures for prevention of the accidents, hazard information on a hazardous spot and a safety measure corresponding to the detected accident;
displaying the extracted hazardous spot;
receiving input information that is a safety measure devised by a worker for the displayed hazardous spot;
comparing the input information with the hazard information to check that the input information and the hazard information match each other; and
controlling tool availability such that a tool is available when the input information and the hazard information match each other and the tool is unavailable when the input information and the hazard information do not match each other.

2. The hazard prediction method according to claim 1, wherein the environment includes positional information on the outdoor facility.

3. The hazard prediction method according to claim 1, further comprising determining normality of the outdoor facility from the image to notify the worker of abnormality when the outdoor facility is abnormal.

4. The hazard prediction method according to claim 1, further comprising acquiring heart rate of the worker to notify, when the heart rate is larger than a threshold, the worker that the heart rate is larger than the threshold.

5. A hazard prediction apparatus comprising:
an image acquisition unit configured to photograph an outdoor facility along with environment to capture an image;
a voice acquisition unit configured to receive an input of voice of a worker;
a display unit configured to display information to the worker;
a tool use control unit configured to restrict use of a tool; and
an information processing unit configured to connect the image acquisition unit, the voice acquisition unit, the display unit, and the tool use control unit,
wherein
the information processing unit includes:
a collation circuit configured to collate the image captured by the image acquisition unit with accident data including photos of outdoor facilities along with environment and accidents occurred at open-air facilities in the photos to detect, when a photo similar to the image is found, an accident occurred at an open-air facility in the photo from the accident data;
an extraction circuit configured to extract, from a safety measure list describing accidents, hazardous spots related to the accidents, and safety measures for prevention of the accidents, hazard information on a hazardous spot and a safety measure corresponding to the accident detected by the collation circuit;
a hazardous spot display circuit configured to cause the display unit to display the hazardous spot extracted by the extraction circuit;

an input circuit configured to receive input information that is a safety measure uttered by a worker for the hazardous spot displayed by the display unit, from the voice acquisition unit;

a checking circuit configured to compare the input information from the input circuit with the hazard information from the extraction circuit to check that the input information and the hazard information match each other; and a control signal output circuit configured to output a signal to the tool use control unit when the input information and the hazard information match each other such that a tool is available and output a signal to the tool use control unit when the input information and the hazard information do not match each other such that a tool is unavailable.

6. The hazard prediction apparatus according to claim 5, further comprising a positional information acquisition unit configured to acquire positional information on the outdoor facility, wherein the environment includes the positional information on the outdoor facility.

7. The hazard prediction apparatus according to claim 5, wherein the information processing unit further includes a normality determination circuit configured to determine normality of the outdoor facility from the image to notify the worker of abnormality when the outdoor facility is abnormal.

8. The hazard prediction apparatus according to claim 5, wherein the information processing unit further includes a health determination circuit configured to acquire heart rate of the worker to notify, when the heart rate is larger than a threshold, the worker that the heart rate is larger than the threshold via the display unit.

* * * * *